(12) United States Patent
Delorme et al.

(10) Patent No.: US 11,149,888 B2
(45) Date of Patent: Oct. 19, 2021

(54) FEMALE NOZZLE OF A CONNECTION ENABLING THE INSERTION OF A MALE NOZZLE WITH A REDUCED FORCE

(71) Applicant: A. RAYMOND ET CIE, Grenoble (FR)

(72) Inventors: Claire-Severine Delorme, La Terrasse (FR); Nicolas Scordialo, Pontcharra (FR)

(73) Assignee: A. RAYMOND ET CIE, Grenoble (FR)

( * ) Notice: Subject to any disclaimer, the term of this patent is extended or adjusted under 35 U.S.C. 154(b) by 279 days.

(21) Appl. No.: 16/384,336

(22) Filed: Apr. 15, 2019

(65) Prior Publication Data

US 2019/0383428 A1    Dec. 19, 2019

(30) Foreign Application Priority Data

Jun. 13, 2018   (FR) ...................... 1855159

(51) Int. Cl.
*F16L 37/088* (2006.01)
*F16L 21/03* (2006.01)
*F16L 21/08* (2006.01)

(52) U.S. Cl.
CPC ........... *F16L 37/0885* (2019.08); *F16L 21/03* (2013.01); *F16L 21/08* (2013.01)

(58) Field of Classification Search
CPC . F16L 21/04; F16L 21/08; F16L 21/03; F16L 37/0885; F16L 37/088

(Continued)

(56) References Cited

U.S. PATENT DOCUMENTS

| 3,936,081 A | 2/1976 | Blumenkranz |
| 2004/0178629 A1 | 9/2004 | Yoshida |

(Continued)

FOREIGN PATENT DOCUMENTS

| DE | 7825916 U1 | 12/1978 |
| EP | 3267086 A1 | 1/2018 |

(Continued)

OTHER PUBLICATIONS

French Search Report for French Application No. 1855159 dated Feb. 1, 2019, 2 pages.

(Continued)

*Primary Examiner* — Aaron M Dunwoody
(74) *Attorney, Agent, or Firm* — TraskBritt

(57) ABSTRACT

A female nozzle of a connection comprising a tubular main body defining a main axis of insertion and having a connection end adapted to receive a male nozzle, one retaining ring inserted into the main body on the connection end side, one internal annular recess having a bottom, a first and a second side wall, with the bottom and the first wall being defined by an internal shoulder of the main body and the second wall being defined by a circular section of the retaining ring, and with the annular recess not being contained in a transversal plane, which is perpendicular to the main axis of insertion and a sealing gasket being positioned in the annular recess. The first and second side walls are oriented toward the bottom of the annular recess, so that the latter has a trapezoidal section so configured as to clamp and hold the sealing gasket.

18 Claims, 2 Drawing Sheets

(58) Field of Classification Search
USPC ................ 285/319, 374, 335, 305, 914, 918
See application file for complete search history.

(56) References Cited

U.S. PATENT DOCUMENTS

2005/0136741 A1   6/2005  Yoshida et al.
2008/0217912 A1*  9/2008  Chaupin ................ F16L 17/02
                                                           285/231

FOREIGN PATENT DOCUMENTS

FR   2883607 A1   9/2006
FR   2855590 B1   10/2006
GB   1578743      11/1980

OTHER PUBLICATIONS

Romanian Search Report for Romanian Application No. 2019 00019 dated Nov. 4, 2019, 8 pages with machine translation.

* cited by examiner

FEMALE NOZZLE OF A CONNECTION ENABLING THE INSERTION OF A MALE NOZZLE WITH A REDUCED FORCE

PRIORITY CLAIM

This application claims the benefit of the filing date of French Patent Application Serial No. 1855159, filed Jun. 13, 2018, for "Female Nozzle of a Connection Enabling the Insertion of a Male Nozzle With a Reduced Force."

TECHNICAL FIELD

This invention relates to a female nozzle of a connection, for example for fluid transport pipes.

BACKGROUND

French Patent No. FR2883607 discloses a tubular connection consisting of a female and a male nozzle. The male nozzle is intended to be inserted coaxially into the connection end of the female nozzle. The female nozzle includes an O-ring located within an annular recess inside the main body forming the female nozzle. This gasket ensures the sealing of the connection when it is connected between two fluid transport pipes. The recess is formed by an internal shoulder of the female nozzle and by the circular section of a retaining ring inserted coaxially into the main body of the female nozzle. The annular recess and the O-ring are completely contained in a transverse plane, perpendicular to the direction of insertion of the male nozzle.

When the male nozzle is inserted into the female nozzle, the penetrating end of the male nozzle makes simultaneous contact with the O-ring on the whole periphery thereof. The axial insertion force that has to be applied to the male nozzle to compress the gasket and enable it to progress to its connection position is high, making the use of the connection uncomfortable.

U.S. Patent Publication No. 2008/0217912 seeks to provide a solution to this problem. In this document, the annular recess in which the O-ring is positioned is not arranged in a transverse plane, i.e., perpendicular to the direction of insertion of the male nozzle. In this case, the penetrating end of the male nozzle only contacts the gasket on a part of its periphery. The gasket is then gradually compressed, as the male nozzle progresses through the female nozzle, over only a part of its periphery. This reduces the maximum insertion force by spreading its application, necessary for compressing the gasket, over an extended insertion length.

In the solution proposed in this document, the recess in the female nozzle has a bottom, a first side wall formed by the circular section of the retaining ring and a second side wall formed by an internal shoulder of the tubular body. The side walls are facing each other and the recess has a section essentially in the shape of a parallelogram. The essentially constant distance between the two side walls is greater than the diameter of the O-ring so that it can fit freely in the recess.

When the male nozzle is inserted into the female nozzle, it contacts a part of the gasket and tends to push it against the side wall formed by the internal shoulder of the hollow body before compressing it at the bottom of the recess. When pushing the gasket back into the recess, it tends to twist, making it more difficult to compress. The insertion forces applied to the male nozzle are still relatively high.

BRIEF SUMMARY

The present disclosure aims to overcome all or part of the drawbacks of the prior art. In particular, it aims at providing a female nozzle of a connection enabling the insertion of a male nozzle with a reduced force.

In order to achieve this goal, a female nozzle of a connection is disclosed, comprising:
- a tubular main body defining a main axis of insertion and having one connection end adapted to receive a male nozzle;
- one retaining ring inserted into the main body on the connection end side, with the retaining ring having a circular section;
- one internal annular recess having a bottom, a first and a second side wall, with the bottom and the first wall being defined by an internal shoulder of the main body and the second wall being defined by the circular section of the retaining ring, with the annular recess not being contained in a transversal plane, which is perpendicular to the main axis of insertion; and
- a sealing gasket positioned in the annular recess.

The first and second side walls of the female connection are oriented toward the bottom of the annular recess, so that the latter has a trapezoidal section configured so as to clamp and retain the sealing gasket.

By thus trapping the gasket in the annular recess, its movement at the bottom of the recess and its twisting when inserting the male nozzle is prevented. The insertion force is therefore moderate, and is not affected by the twisting of the gasket. In addition, the trapezoidal shape of the recess gives it a sufficient volume to accommodate the gasket material when it is compressed by the male nozzle.

According to other advantageous and non-limiting characteristics of the disclosure, taken either separately or in any technically feasible combination:
- the bottom of the annular recess may have a dimension larger than the diameter of a segment of the gasket;
- the retaining ring may have at least one alignment pin configured so as to be accommodated in one alignment recess provided on the main body;
- the retaining ring may include at least one notch provided in one opening of the main body so as to keep the ring clamped in the main body;
- the female nozzle may include a clip engaged as a jumper into recesses of the retaining ring and the main body positioned opposite one another;
- the retaining ring may include a first segment having an outer diameter greater than the outer diameter of a second segment so that a peripheral section of the first segment of the retaining ring positioned against a bearing shoulder of the main body is exposed.

BRIEF DESCRIPTION OF THE DRAWINGS

Other characteristics and advantages of embodiments of the present disclosure will emerge from the detailed description of non-limiting example embodiments presented below with referring to the appended drawings, in which:

FIG. 3 is a graph illustrating a non-limiting example of the variation in distance between the center of an annular recess within a female nozzle in accordance with embodiments of the present disclosure, and a transverse reference plane, as a

DETAILED DESCRIPTION

Figure 1:
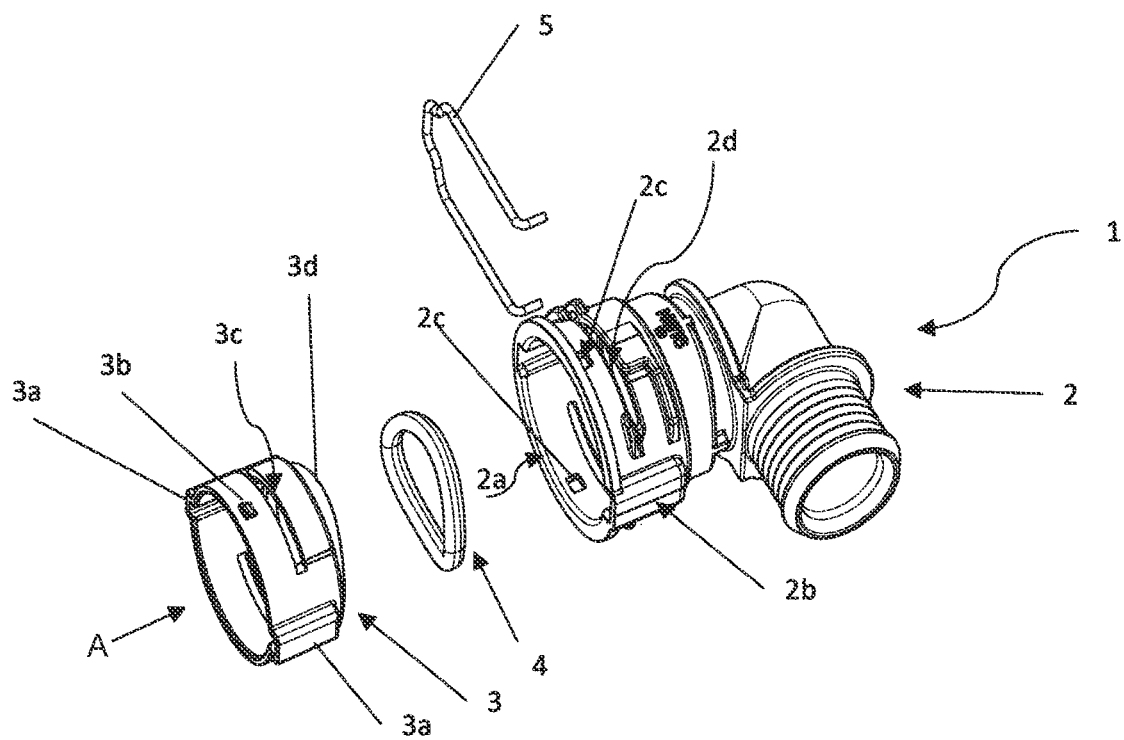
FIG. 1 shows an exploded view of a female nozzle according to the present disclosure.

The female nozzle 1 includes of a tubular main body 2, shown here as being angled in the non-limiting embodiment illustrated in FIG. 1. The main body 2 has a connection end 2a for receiving the end of a male nozzle, not shown in the figures. The tubular main body 2 defines a main axis A along which the male nozzle may be inserted.

The female nozzle 1 also includes a retaining ring 3, the outer diameter of which is adjusted to the inner diameter of the connection end 2a of the main body 2 so that it can be accommodated therein. Alignment pins 3a make it possible for the ring 3 to be inserted into the main body 2 at a given angular orientation by sliding into alignment recesses 2b provided on the main body 2. Two notches 3b formed on the outer periphery of the ring 3 are provided to fit into openings 2c provided on the connection end 2a of the main body 2 and to maintain the ring 3 clipped into the main body 2.

The female nozzle 1 also includes an O-ring gasket 4, which is retained in the main body 2 by the ring 3.

When the ring 3 is inserted into the main body 2 in the assembled, functional configuration of the female nozzle 1, two clip recesses 3c arranged on the ring 3 and diametrically opposite each other are respectively arranged so as to correspond to two and align with other clip recesses 2d provided on the main body 2. A jumper clip 5, which can be metallic, can be inserted into the clip recesses 3c, 2d in order to firmly retain the ring 3 on the main body 2.

However, embodiments of the present disclosure are by no means limited to the features for fixing the ring 3 to the main body 2 just described, and any other means for retaining the ring 3 on the main body 2 may be considered as a replacement for, or in addition to those presented.

Figure 2:
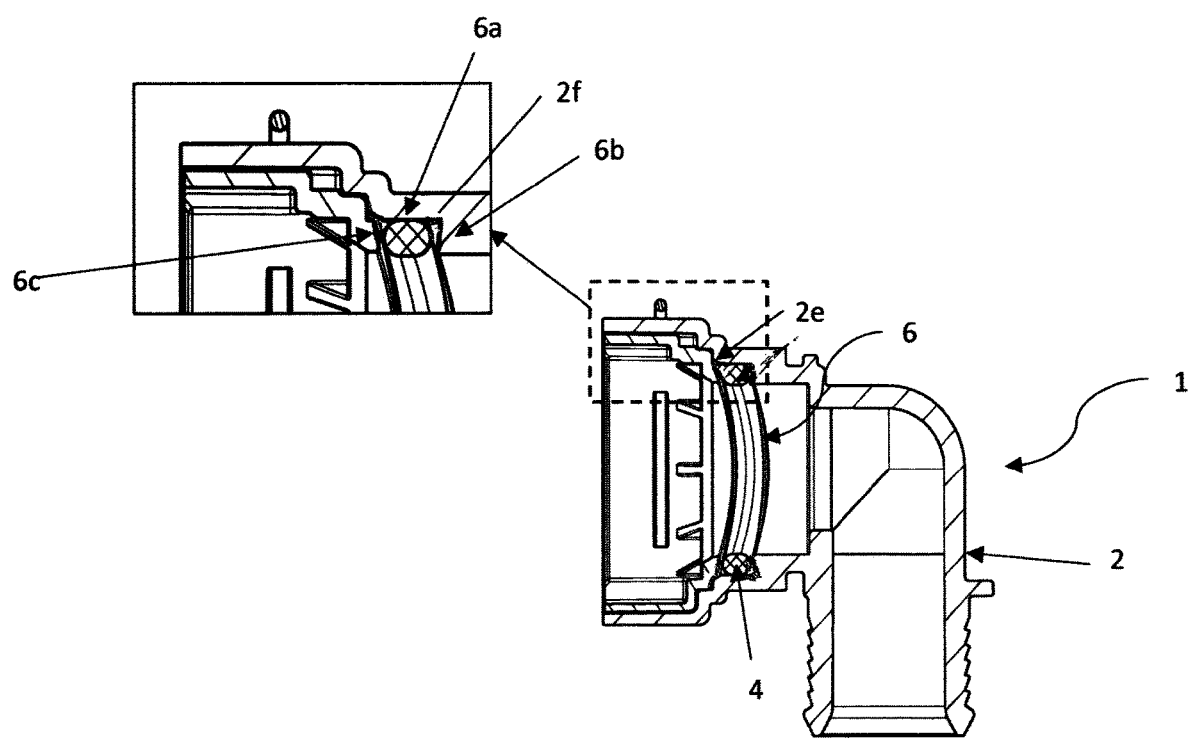
FIG. 2 shows a cross-sectional view of a female nozzle according to the present disclosure in an assembled, functional configuration.

FIG. 2 shows that the gasket 4 resides in an internal annular recess 6 of the female nozzle 1 that is not contained in a transverse plane, i.e., in a plane perpendicular to the main insertion axis A of the male nozzle. In other words, the gasket 4 and the internal annular recess 6 of the female nozzle are not planar in the assembled, functional configuration. In this way, the penetrating end of the male nozzle comes into contact with the O-ring gasket 4 over only a part of its periphery. This part tends to increase as the male connection progresses. As a result, the gasket 4 is gradually compressed, thus reducing the maximum insertion force required compared to the case where the gasket is planar and entirely located in a transverse plane perpendicular to the main axis A along which the male nozzle may be inserted.

In the example shown, the annular recess 6 has a "wavy" shape, i.e., the distance between the center of the annular recess 6 and a transverse reference plane (e.g., located at the opening of the female nozzle 1 as shown in FIG. 2) varies in the form of a sine wave with the radial orientation. The solid line in FIG. 3 thus illustrates the variation in distance between the center of an annular recess 6 within a female nozzle 1 and a transverse reference plane (which can be arbitrarily defined as any plane that is perpendicular to the main axis A along which the male nozzle may be inserted, as a function of circumferential position around the annular recess 6 through 360° of rotation. By thus modulating the distance from the center of the annular recess 6 to a reference plane with such radial orientation, it is ensured that the gasket 4 does not reside in a planar, transverse plane. Of course, embodiments of the disclosure are not limited to the particular "wavy" shape represented by FIG. 3, and any other shape that distorts the gasket 4 to place it outside a transverse plane may be appropriate. This could be, for example, the shape shown as a dotted line in FIG. 3.

Figure 3:
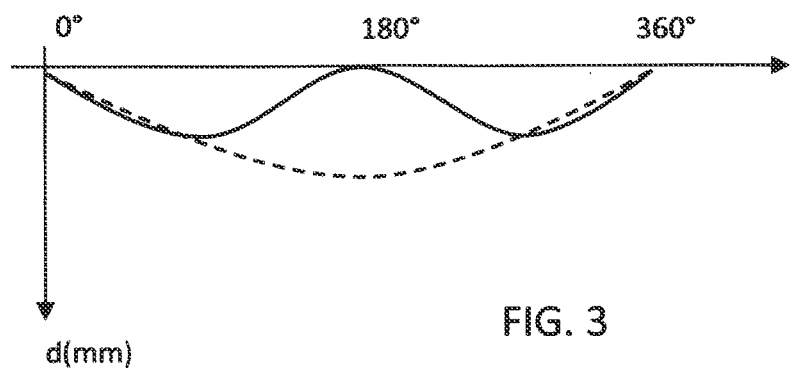

In the example shown in FIGS. 1 and 2, the retaining ring 3 comprises a first straight segment, i.e., with a constant length, and a second section 3d the length of which varies with the radial orientation, for example according to the developed shape shown as a solid line in FIG. 3. The first section has a larger outer diameter than the outer diameter of the second section 3d. This difference in diameter exposes a peripheral edge of the first section of the retaining ring 3 that can be placed against a bearing shoulder 2e of the main body 2. This makes it easier to position the ring 3 in the main body 2 and to insert the metal jumper clip 5 into the jumper clip recesses.

As clearly visible on the insert in FIG. 2, the internal annular recess 6 is defined by a bottom 6a and two side walls 6b, 6c, which face the bottom 6a of the internal annular recess 6. The body 2 has a shoulder 2f defining the bottom 6a and a first side wall 6b of the internal annular recess 6. The circular section of the retaining ring 3, and more precisely the circular section of the second segment of this ring, defines the second side wall 6c of the internal annular recess 6.

The sections of the retaining ring 3 and the shoulder 2f do not reside in a transverse plane, but are inclined toward this plane to face the bottom 6a of the internal annular recess 6. Thus, the annular recess 6 has a trapezoidal section, with the large base of the trapezoid being the bottom 6a of the internal annular recess 6. The small base of the trapezoid is defined by the smallest distance between the circular section of the ring 3 and the shoulder 2f of the main body 2.

According to embodiments of the disclosure, this small base is chosen to be smaller than or equal to the diameter of a section of the O-ring gasket 4 in its free-standing state, i.e., when it is not deformed by compression. In this way, the gasket 4 is clamped and retained between the section of the retaining ring 3 and the shoulder 2f of the main body 2. It is therefore not likely to be displaced from the annular recess 6. By thus trapping the gasket 4 in the annular recess 6, movement and twisting of the gasket 4 is prevented when inserting the male nozzle. This feature ensures that the insertion force of the male nozzle remains low.

To facilitate the compression of the gasket 4, and to contribute to a minimum insertion force of the male nozzle, the size of the large base of internal annular recess 6 (the bottom 6a) is advantageously chosen so that it is larger than the diameter of a section of the O-ring gasket 4 in its free-standing state. This creates a space in the annular recess 6 making it possible to accommodate the material the gasket 4 is made of, when it is compressed and deformed by the male nozzle as it progresses into the female nozzle.

Of course, the invention is not limited to the described example embodiments and alternative solutions can be used without departing from the scope of the invention, as defined in the claims.

What is claimed is:

1. A female nozzle of a connection, comprising:
   a tubular main body defining a main axis of insertion and having one connection end adapted to receive a male nozzle;
   a retaining ring inserted into the tubular main body on the one connection end, the retaining ring having a circular section, wherein the retaining ring carries at least one alignment pin configured to be received in an alignment recess provided on the tubular main body;

an internal annular recess having a bottom wall, a first side wall, and a second side wall, the bottom wall and the first side wall being defined by an internal shoulder of the tubular main body, the second side wall being defined by the circular section of the retaining ring, the internal annular recess not being contained in a transverse plane, perpendicular to the main axis of insertion of the tubular main body, the first side wall and the second side wall being oriented toward the bottom of the internal annular recess such that the internal annular recess has a trapezoidal cross-section; and a sealing gasket positioned in the internal annular recess, the sealing gasket being clamped and held in the internal annular recess.

2. The female nozzle of claim 1, wherein the bottom wall of the internal annular recess has a dimension greater than a diameter of a section of the sealing gasket.

3. The female nozzle of claim 2, wherein the retaining ring comprises at least one notch provided in one opening of the tubular main body to maintain the retaining ring in the tubular main body.

4. The female nozzle of claim 3, wherein the retaining ring and the tubular main body comprise clip recesses aligned with one another, and wherein the female nozzle further comprises a jumper clip engaged into the clip recesses of the retaining ring and of the tubular main body.

5. The female nozzle of claim 4, wherein the retaining ring includes a first segment and a second segment, the first segment having an outer diameter greater than an outer diameter of the second segment, a peripheral section of the first segment of the retaining ring abutting against a bearing shoulder of the tubular main body.

6. The female nozzle of claim 1, wherein the retaining ring comprises at least one notch provided in one opening of the tubular main body to maintain the retaining ring in the tubular main body.

7. The female nozzle of claim 1, wherein the retaining ring and the tubular main body comprise clip recesses aligned with one another, and wherein the female nozzle further comprises a jumper clip engaged into the clip recesses of the retaining ring and of the tubular main body.

8. The female nozzle of claim 1, wherein the retaining ring includes a first segment and a second segment, the first segment having an outer diameter greater than an outer diameter of the second segment, a peripheral section of the first segment of the retaining ring abutting against a bearing shoulder of the tubular main body.

9. A female nozzle of a connection, comprising:
a tubular main body defining a main axis of insertion and having one connection end adapted to receive a male nozzle;
a retaining ring inserted into the tubular main body on the one connection end, the retaining ring having a circular section, wherein the retaining ring comprises at least one notch provided in one opening of the tubular main body to maintain the retaining ring in the tubular main body;
an internal annular recess having a bottom wall, a first side wall, and a second side wall, the bottom wall and the first side wall being defined by an internal shoulder of the tubular main body, the second side wall being defined by the circular section of the retaining ring, the internal annular recess not being contained in a transverse plane, perpendicular to the main axis of insertion of the tubular main body, the first side wall and the second side wall being oriented toward the bottom of the internal annular recess such that the internal annular recess has a trapezoidal cross-section; and
a sealing gasket positioned in the internal annular recess, the sealing gasket being clamped and held in the internal annular recess.

10. The female nozzle of claim 9, wherein the bottom wall of the internal annular recess has a dimension greater than a diameter of a section of the sealing gasket.

11. The female nozzle of claim 9, wherein the retaining ring carries at least one alignment pin configured to be received in an alignment recess provided on the tubular main body.

12. The female nozzle of claim 9, wherein the retaining ring and the tubular main body comprise clip recesses aligned with one another, and wherein the female nozzle further comprises a jumper clip engaged into the clip recesses of the retaining ring and of the tubular main body.

13. The female nozzle of claim 9, wherein the retaining ring includes a first segment and a second segment, the first segment having an outer diameter greater than an outer diameter of the second segment, a peripheral section of the first segment of the retaining ring abutting against a bearing shoulder of the tubular main body.

14. A female nozzle of a connection, comprising:
a tubular main body defining a main axis of insertion and having one connection end adapted to receive a male nozzle;
a retaining ring inserted into the tubular main body on the one connection end, the retaining ring having a circular section;
an internal annular recess having a bottom wall, a first side wall, and a second side wall, the bottom wall and the first side wall being defined by an internal shoulder of the tubular main body, the second side wall being defined by the circular section of the retaining ring, the internal annular recess not being contained in a transverse plane, perpendicular to the main axis of insertion of the tubular main body, the first side wall and the second side wall being oriented toward the bottom of the internal annular recess such that the internal annular recess has a trapezoidal cross-section; and
a sealing gasket positioned in the internal annular recess, the sealing gasket being clamped and held in the internal annular recess;
wherein the retaining ring and the tubular main body comprise clip recesses aligned with one another, and wherein the female nozzle further comprises a jumper clip engaged into the clip recesses of the retaining ring and of the tubular main body.

15. The female nozzle of claim 14, wherein the bottom wall of the internal annular recess has a dimension greater than a diameter of a section of the sealing gasket.

16. The female nozzle of claim 14, wherein the retaining ring carries at least one alignment pin configured to be received in an alignment recess provided on the tubular main body.

17. The female nozzle of claim 14, wherein the retaining ring comprises at least one notch provided in one opening of the tubular main body to maintain the retaining ring in the tubular main body.

18. The female nozzle of claim 14, wherein the retaining ring includes a first segment and a second segment, the first segment having an outer diameter greater than an outer diameter of the second segment, a peripheral section of the first segment of the retaining ring abutting against a bearing shoulder of the tubular main body.

* * * * *